(12) United States Patent
Unagami

(10) Patent No.: US 11,983,282 B2
(45) Date of Patent: *May 14, 2024

(54) DATA PROTECTION METHOD, AUTHENTICATION SERVER, DATA PROTECTION SYSTEM, AND DATA STRUCTURE

(71) Applicant: Panasonic Intellectual Property Corporation of America, Torrance, CA (US)

(72) Inventor: Yuji Unagami, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,152

(22) Filed: Nov. 18, 2022

(65) Prior Publication Data

US 2023/0083454 A1  Mar. 16, 2023

Related U.S. Application Data

(63) Continuation of application No. 16/523,333, filed on Jul. 26, 2019, now Pat. No. 11,531,768.

(30) Foreign Application Priority Data

May 23, 2019  (JP) ................................ 2019-096863

(51) Int. Cl.
*G06F 21/60* (2013.01)
*H04L 9/00* (2022.01)
(Continued)

(52) U.S. Cl.
CPC .......... *G06F 21/602* (2013.01); *H04L 9/0637* (2013.01); *H04L 9/0643* (2013.01); *H04L 9/3247* (2013.01); *H04L 9/50* (2022.05)

(58) Field of Classification Search
CPC ... G06F 21/64; G06F 21/6245; H04L 9/3236; H04L 9/32; H04L 9/321; H04L 9/3247
See application file for complete search history.

(56) References Cited

U.S. PATENT DOCUMENTS

2007/0150596 A1  6/2007  Miller et al.
2018/0082023 A1  3/2018  Curbera et al.
(Continued)

FOREIGN PATENT DOCUMENTS

| CN | 106971101 | 7/2017 |
| JP | 2018-518758 | 7/2018 |
| WO | 2016/186869 | 11/2016 |

OTHER PUBLICATIONS

Kazukuni Kobara, "Cyber Physical Security for Industrial Control Systems and IoT", IEICE Transactions on Information and Systems, vol. E99-D, No. 4, Apr. 2016, pp. 787-795.
(Continued)

*Primary Examiner* — Olugbenga O Idowu
(74) *Attorney, Agent, or Firm* — WENDEROTH, LIND & PONACK, L.L.P.

(57) ABSTRACT

Provided is a data protection method which includes: receiving transaction data which includes a first hash value obtained from history information of a home; obtaining, from a data server, a second hash value computed by the data server performing computation processing on encrypted history information without decrypting the encrypted history information, the encrypted history information being history information of the home encrypted using a secure computation method which enables computation without decrypting the encrypted history information, the encrypted history
(Continued)

information being obtained from the home; verifying the transaction data, and determining whether the first hash value and the second hash value match; and when a validity of the transaction data is verified and the first hash value and the second hash value match, recording the transaction data in a distributed ledger.

6 Claims, 13 Drawing Sheets

Related U.S. Application Data

(60) Provisional application No. 62/715,929, filed on Aug. 8, 2018.

(51) Int. Cl.
  *H04L 9/06* (2006.01)
  *H04L 9/32* (2006.01)

(56) References Cited

U.S. PATENT DOCUMENTS

| | | | |
|---|---|---|---|
| 2018/0157700 A1 | 6/2018 | Roberts et al. | |
| 2019/0014176 A1* | 1/2019 | Tormasov | H04L 63/123 |
| 2021/0314143 A1* | 10/2021 | Conner | H04L 9/3239 |

OTHER PUBLICATIONS

Daniel Demmler, et al., "ABY—A Framework for Efficient Mixed-Protocol Secure Two-Party Computation", Network and Distributed System Security Symposium, Feb. 2015.

Zvika Brakerski, et al., "Fully Homomorphic Encryption without Bootstrapping", from https://eprint.iacr.org/2011/277.pdf, Retrieved Jul. 20, 2018.

Extended European Search Report dated Oct. 21, 2019 in corresponding European Patent Application No. 19189176.1.

Search Report issued Feb. 23, 2024 in corresponding Chinese Patent Application No. 201910716321.4, with English translation.

* cited by examiner

DATA PROTECTION METHOD, AUTHENTICATION SERVER, DATA PROTECTION SYSTEM, AND DATA STRUCTURE

CROSS REFERENCE TO RELATED APPLICATION

This application is a continuation of U.S. application Ser. No. 16/523,333, filed Jul. 26, 2019, which claims the benefit of priority of U.S. Provisional Application No. 62/715,929 filed on Aug. 8, 2018 and Japanese Patent Application Number 2019-096863 filed on May 23, 2019, the entire contents of which are hereby incorporated by reference.

BACKGROUND

1. Technical Field

The present disclosure relates to a data protection method, an authentication server, a data protection system, and a data structure, and relates in particular to a data protection method, an authentication server, a data protection system, and a data structure for usage of data collected from a user.

2. Description of the Related Art

In recent years, a system that collects, analyzes, and distributes data, such as data on a user and data on a device, has been studied. In the years to come, as the Internet of Things (IoT) advances and artificial intelligence (AI) and the like become popular, it will become possible to collect more data than ever before, so usage of collected data is expected.

However, for usage of collected data, it is important to protect privacy information included in the data. In other words, privacy protection for the data is important.

For example, Non Patent Literature 1 ("Cyber Physical Security for Industrial Control Systems and IoT", IEICE TRANS. INF. & SYST., VOL. E99-D, NO. 4 APRIL 2016) (hereinafter referred to as NPL 1) discloses a technology related to security for industrial control systems (ICSs) and IoT. According to NPL 1, it is important to protect not only sensor information but also privacy information related to personal data on health care and wearables, for example.

SUMMARY

However, when the system that collects and distributes data encrypts the collected data before distribution in order to protect the privacy of the collected data, companies and the like that provide services find it difficult to use data that they obtain, since the obtained data is encrypted. On the other hand, if the system distributes the collected data in plain text, the user would not provide data due to the risk of data leakage. As a result, the system cannot collect sufficient data for data usage.

The present disclosure has been conceived in view of the above circumstances, and provides a data protection method and the related technologies that enable data usage while protecting the privacy of the data.

In order to provide such a data protection method and the related technologies, a data protection method according to the present disclosure is a data protection method for a data protection system which includes a device, a plurality of authentication servers, and a plurality of data servers. The data protection method is performed by a first authentication server included in the plurality of authentication servers, and includes: receiving transaction data which is generated by the device and includes a first hash value obtained from history information of the device; obtaining, from at least one of the plurality of data servers, a second hash value computed by the at least one of the plurality of data servers performing computation processing on encrypted history information without decrypting the encrypted history information, the encrypted history information being history information of the device encrypted using a secure computation method which enables computation without decrypting the encrypted history information, the encrypted history information being obtained from the device and recorded in the at least one of the plurality of data servers; verifying the transaction data, and determining whether the first hash value and the second hash value match; and when a validity of the transaction data is verified and the first hash value and the second hash value match, recording the transaction data in a distributed ledger in synchronization with the plurality of authentication servers excluding the first authentication server.

Note that the above general or specific aspect may be realized by a system, an integrated circuit, a computer program, or a computer-readable recording medium such as a compact disc read only memory (CD-ROM), or by any combination of systems, methods, integrated circuits, computer programs, and recording media.

The present disclosure can realize a data protection method and the related technologies that enable data usage while protecting the privacy of the data.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF EMBODIMENT

Figure 1:
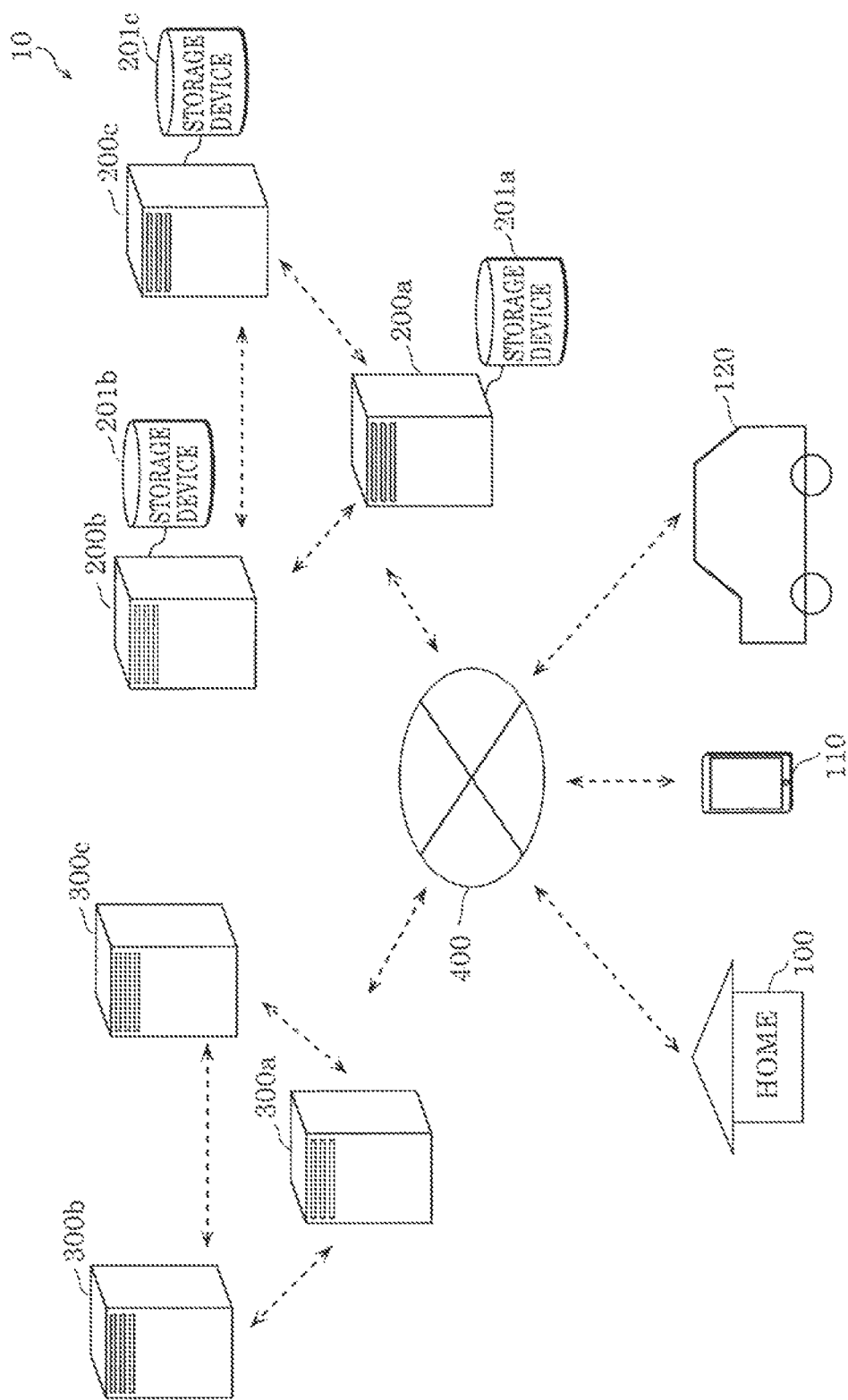
FIG. 1 illustrates an example of the overall configuration of a data protection system according to an embodiment.

A data protection method according to an aspect of the present disclosure is a data protection method for a data protection system which includes a device, a plurality of authentication servers, and a plurality of data servers. The data protection method is performed by a first authentication server included in the plurality of authentication servers, and includes: receiving transaction data which is generated by the device and includes a first hash value obtained from history information of the device; obtaining, from at least one of the plurality of data servers, a second hash value computed by the at least one of the plurality of data servers performing computation processing on encrypted history information without decrypting the encrypted history information, the encrypted history information being history information of the device encrypted using a secure computation method which enables computation without decrypting the encrypted history information, the encrypted history information being obtained from the device and recorded in the at least one of the plurality of data servers; verifying the transaction data, and determining whether the first hash value and the second hash value match; and when a validity of the transaction data is verified and the first hash value and the second hash value match, recording the transaction data in a distributed ledger in synchronization with the plurality of authentication servers excluding the first authentication server.

This makes it possible to implement a data protection method and the related technologies that enable data usage while protecting the privacy of the data.

The data protection method may further include: obtaining identification information and a third hash value from the device, the identification information identifying first encrypted history information of first history information which is targeted for data verification, the third hash value being obtained from the first history information; generating first transaction data which includes the identification information and indicates a data verification request, and transmitting the first transaction data to the at least one of the plurality of data servers; obtaining, from the at least one of the plurality of data servers, a fourth hash value computed by the at least one of the plurality of data servers performing computation processing on the first encrypted history information without decrypting the first encrypted history information, the first encrypted history information being identified by the identification information from among one or more items of encrypted history information obtained from the device and recorded in the at least one of the plurality of data servers; determining whether the third hash value and the fourth hash value match; and when the third hash value and the fourth hash value do not match, generating second transaction data which includes the identification information and indicates a deletion request for deletion of the first encrypted history information identified by the identification information, and transmitting the second transaction data to the at least one of the plurality of data servers.

Accordingly, when the history information of the device targeted for data verification does not match the history information stored in the data servers, the encrypted history information of the device stored in the data servers can be deleted.

The data protection method may further include: when the third hash value and the fourth hash value do not match, recording the second transaction data in the distributed ledger in synchronization with the plurality of authentication servers excluding the first authentication server.

By doing so, it is possible to keep a record in a blockchain that the history information of the device does not match the history information stored in the data servers.

The history information may include personal data of a user of the device, for example.

An authentication server according to an aspect of the present disclosure is an authentication server in a data protection system which includes a device, a plurality of authentication servers including the authentication server, and a plurality of data servers. The authentication server includes: a communication unit configured to receive transaction data which is generated by the device and includes a first hash value obtained from history information of the device, and obtain, from at least one of the plurality of data servers, a second hash value computed by the at least one of the plurality of data servers performing computation processing on encrypted history information without decrypting the encrypted history information, the encrypted history information being history information of the device encrypted using a secure computation method which enables computation without decrypting the encrypted history information, the encrypted history information being obtained from the device and recorded in the at least one of the plurality of data servers; a transaction data verifier which verifies the transaction data; a data verifier which determines whether the first hash value and the second hash value match; and a recorder which records the transaction data in a distributed ledger in synchronization with the plurality of authentication servers excluding the authentication server, when a validity of the transaction data is verified and the first hash value and the second hash value match.

A data protection system according to an aspect of the present disclosure is a data protection system which includes; a device; a plurality of authentication servers; and a plurality of data servers. Here, the device includes: a transaction data generator which generates transaction data including a first hash value obtained from history information of the device, and transmits the transaction data to an authentication server included in the plurality of authentication servers; and a first secure computation calculator which generates encrypted history information by encrypting the history information using a secure computation method which enables computation without decrypting the encrypted history information, and transmits the encrypted history information to the plurality of data servers. Each of the plurality of data servers includes: a recorder which records the encrypted history information obtained from the device; and a second secure computation calculator which computes a second hash value of the recorded encrypted history information by performing computation processing on the recorded encrypted history information without decrypting the recorded encrypted history information, and transmits the second hash value to the authentication server. The authentication server includes: a communication unit configured to receive the transaction data including the first hash value from the device, and obtain the second hash value from at least one of the plurality of data servers; a transaction data verifier which verifies the transaction data; a data verifier which determines whether the first hash value and the second hash value match; and a recorder which records the transaction data in a distributed ledger in synchronization with the plurality of authentication servers excluding the authentication server, when a validity of the transaction data is verified and the first hash value and the second hash value match.

A data structure according to an aspect of the present disclosure is a data structure used for a block recorded in a blockchain in a data protection system which includes a device, a plurality of authentication servers, and a plurality of data servers. The data structure includes: a blockchain address which is an identifier for identifying a creator of transaction data included in the block of the blockchain; a transaction ID for identifying the transaction data; a first hash value which is included in the transaction data and obtained from history information of the device; and an electronic signature of a user of the transaction data. The transaction data is included in the block when the first hash value and a second hash value match, the second hash value being computed by at least one of the plurality of data servers performing computation processing on encrypted history information without decrypting the encrypted history information, the encrypted history information being obtained from the device and being history information of the device encrypted using a secure computation method which enables computation without decrypting the encrypted history information.

The following describes an exemplary embodiment with reference to the drawings. Note that the following embodiment shows one specific example of the present disclosure. Therefore, the numerical values, shapes, materials, structural elements, the arrangement and connection of the structural elements, etc. illustrated in the following embodiment are mere examples, and are not intended to limit the present disclosure. Among the structural elements in the following exemplary embodiment, those not recited in any of the independent claims representing how an aspect of the present disclosure is implemented will be described as optional elements. How the present disclosure is implemented is not limited by the current independent claims, and can be represented by other independent claims as well.

EMBODIMENT

First, the following describes a system configuration according to the present disclosure.

1. System Configuration

The data protection system according to the present disclosure records, in a data server, encrypted data obtained by encrypting data, such as a device's history information, using a method capable of secure computation, and records, in a distributed ledger, transaction data which includes a hash value of the encrypted data. Accordingly, the data protection system according to the present disclosure can, using blockchain technology, collect and use data while protecting the privacy of the data.

The following describes the data protection system and the related technologies according to the present embodiment with reference to the drawings.

1.1 Overall Configuration of Data Protection System 10

FIG. 1 illustrates an example of the overall configuration of data protection system 10 according to the present embodiment.

As illustrated in FIG. 1, data protection system 10 includes home 100, terminal 110, vehicle 120, authentication servers 200a, 200b, and 200c, and data servers 300a, 300b, and 300c, for example. These elements are connected via communication network 400.

Authentication servers 200a, 200b, and 200c (hereinafter also referred to as authentication servers 200) are connected with storage devices 201a, 201b, and 201c (hereinafter also referred to as storage devices 201), respectively. Authentication servers 200 may be connected with storage devices 201 via communication network 400, or may internally include storage devices 201. Storage devices 201 each include a distributed ledger for electronically recording a blockchain composed of transaction data blocks.

Note that although FIG. 1 illustrates an example case where data protection system 10 includes three authentication servers and three data servers, the number of authentication servers and the number of data servers are not limited to three. That is to say, data protection system 10 may include four or more authentication servers, and may include four or more data servers.

1.2 Configuration of Home 100

Figure 2:
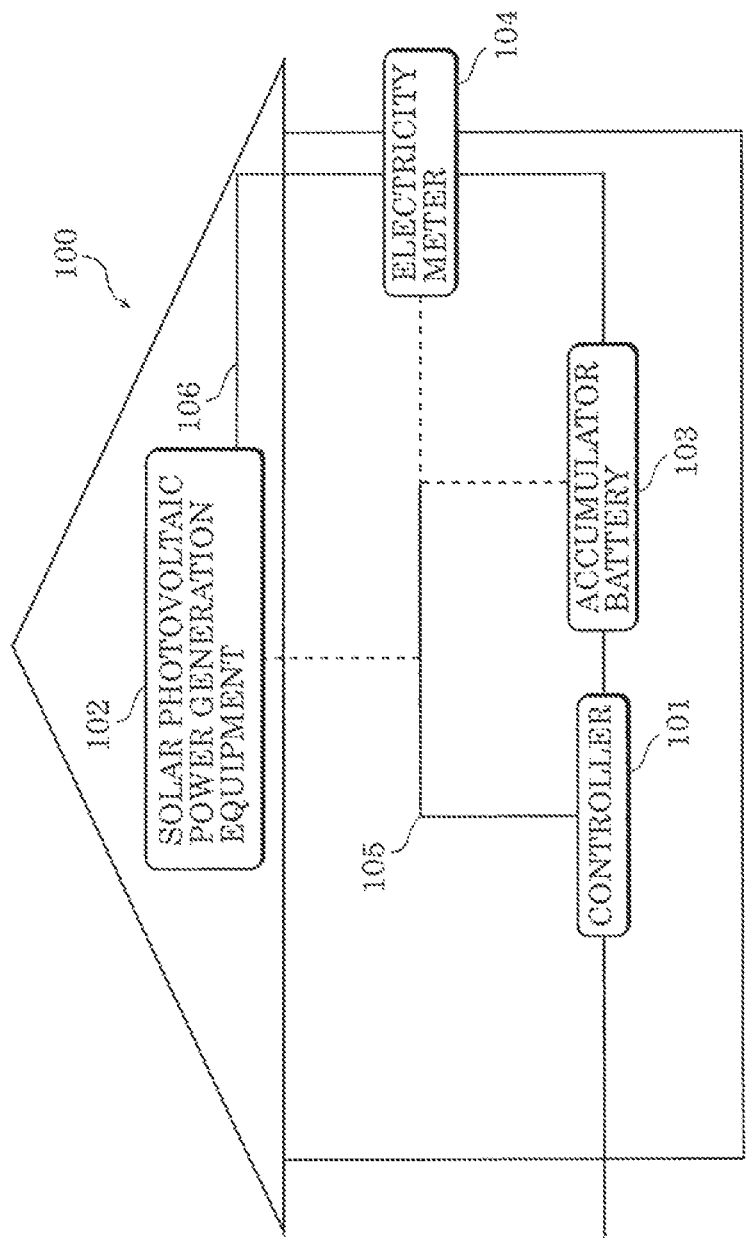
FIG. 2 illustrates an example of the overall configuration of a home according to the embodiment.

FIG. 2 illustrates an example of the overall configuration of home 100 according to the present embodiment.

As illustrated in FIG. 2, home 100 includes controller 101, solar photovoltaic power generation equipment 102, accumulator battery 103, and electricity meter 104. Controller 101, solar photovoltaic power generation equipment 102, accumulator battery 103, and electricity meter 104 are connected via communication network 105. Solar photovoltaic power generation equipment 102, accumulator battery 103, and electricity meter 104 are connected via power network 106. Note that home 100 is, for example, a building such as a house, but is not limited to this. Home 100 may be a building such as a factory. In other words, home 100 may be any building so long as it is used by a user. Hereinafter, a device located at home 100 is called a home device. The home device is an example of a device according to the present disclosure. The home device may include or exclude solar photovoltaic power generation equipment 102, accumulator battery 103, and electricity meter 104. Home 100 may be an example of the device according to the present disclosure.

<Controller 101>

Controller 101 is a controller for an energy management system, for example. In the present embodiment, controller 101 controls solar photovoltaic power generation equipment 102, displays a power generation state of solar photovoltaic power generation equipment 102 and a power accumulation state of accumulator battery 103, and inputs, for example, a request for buying or selling of power. Controller 101 manages the amount of power transmitted to an external power network (not illustrated) via electricity meter 104, and transmits a notification to authentication servers 200. As described, controller 101 controls home devices, displays the states of the home devices, inputs data into the home devices, and manages operation histories and state changes of the home devices.

<Solar Photovoltaic Power Generation Equipment 102>

Solar photovoltaic power generation equipment 102 is an apparatus having a power generation mechanism for directly converting solar light to power using solar battery. Solar photovoltaic power generation equipment 102 uses the generated power at home 100, accumulates the generated power in accumulator battery 103, and transmits the generated power to the power network.

<Accumulator Battery 103>

Accumulator battery 103 accumulates the power generated by solar photovoltaic power generation equipment 102. Accumulator battery 103 transmits the accumulated power to the power network according to a power transmission instruction from controller 101, for example. Accumulator battery 103 may accumulate power received from the power network according to a power reception instruction from controller 101, for example. Note that accumulator battery 103 is not an essential element, and need not be included in home 100.

<Electricity Meter 104>

Electricity meter 104 measures the amount of power transmitted to the external power network or the amount of power received from the external power network. When solar photovoltaic power generation equipment 102 or accumulator battery 103 transmits power to the power network according to a power transmission instruction from controller 101, electricity meter 104 measures the time at which solar photovoltaic power generation equipment 102 or accumulator battery 103 has transmitted the power and the amount of the power transmitted, and notifies controller 101 of the time and the amount measured. Electricity meter 104 measures the amount of power used after power reception from the power network according to a power use instruction from controller 101.

The following describes an example of the configuration of controller 101.

1.3 Configuration of Controller 101

Figure 3:
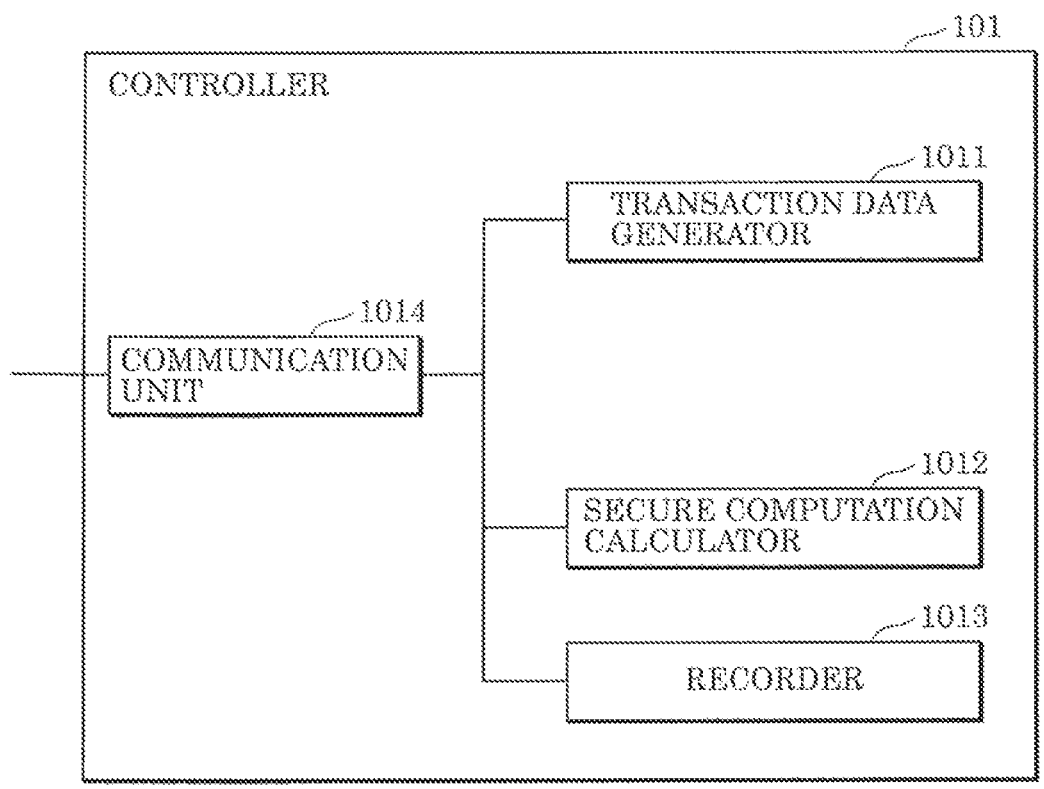
FIG. 3 is a block diagram illustrating an example of the functional configuration of a controller illustrated in FIG. 2.

FIG. 3 is a block diagram illustrating an example of the functional configuration of controller 101 illustrated in FIG. 2.

Controller 101 includes a processor and memory having a program stored therein for causing the processor to execute predetermined processing. In other words, controller 101 is realized as a result of the processor executing a given program using the memory. In the present embodiment, controller 101 includes, as illustrated in FIG. 3, transaction data generator 1011, secure computation calculator 1012, recorder 1013, and communication unit 1014.

<Transaction Data Generator 1011>

When a user controls a home device and transaction data generator 1011 receives a control history from the device or when the state of a home device changes and transaction data generator 1011 receives a state history from the device, transaction data generator 1011 generates transaction data for the blockchain based on history information of the device such as the control history and the state history. Here, the history information of the device is an example of personal data, and includes personal data of the user of the device.

In the present embodiment, transaction data generator 1011 computes a hash value (referred to as a first hash value) of the history information of the device received from the device, and generates transaction data including the computed first hash value.

Figure 4:
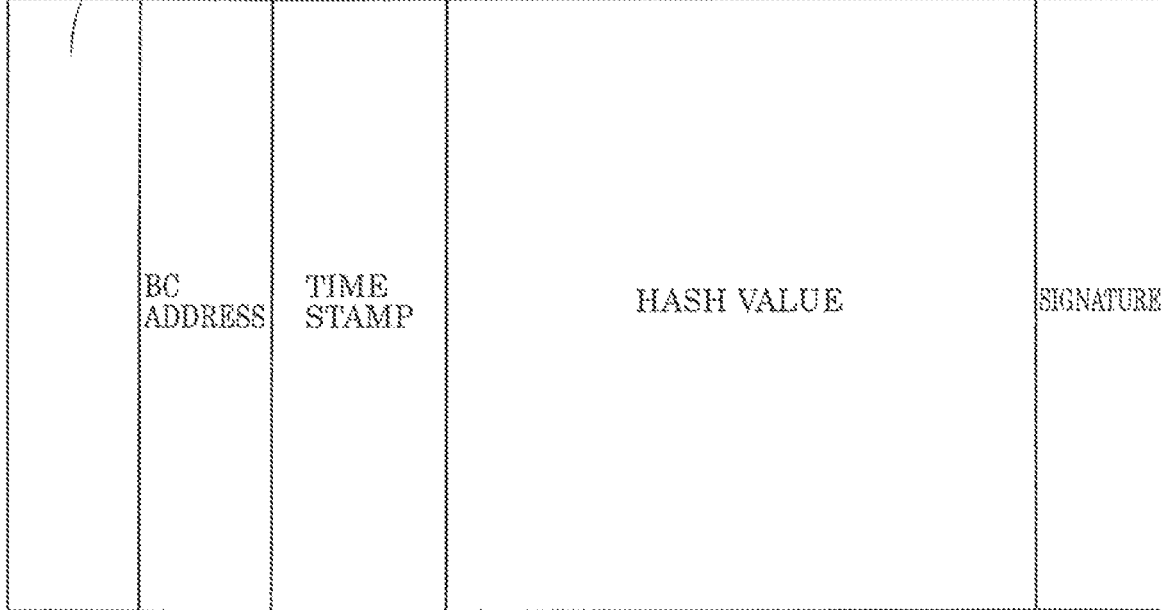
FIG. 4 illustrates an example of the data structure of transaction data according to the embodiment.

Here, with reference to FIG. 4, an example of the structure (data structure) of the transaction data generated by transaction data generator 1011 will be described. FIG. 4 illustrates an example of the data structure of transaction data according to the present embodiment.

As illustrated in FIG. 4, the data structure of the transaction data generated by transaction data generator 1011 includes a transaction ID, a blockchain address, a first hash value, and a signature. The transaction ID is an identifier for identifying the transaction data. The blockchain address is an identifier for identifying the creator of the transaction data, and is represented as a BC address in FIG. 4. In the present embodiment, the blockchain address enables identification of the user or controller corresponding to history information from which the first hash value is obtained. The first hash value is obtained from history information of a device, and is included in transaction data. As illustrated in FIG. 4, the first hash value is included in the payload portion of the transaction data, that is, the main body of the transaction data. The signature is an electronic signature of the user. In the present embodiment, the signature is generated using a signature generation key unique to the user. Note that transaction data generator 1011 may generate transaction data which further includes an identifier for identifying the history information of the device.

Transaction data generator 1011 records the generated transaction data in recorder 1013. Furthermore, transaction data generator 1011 transmits the generated transaction data to at least one authentication server 200 among authentication servers 200a, 200b, and 200c via communication unit 1014.

<Secure Computation Calculator 1012>

Secure computation calculator 1012 generates encrypted history information which is history information of a device encrypted using a secure computation method which enables computation without decrypting the encrypted history information. In the present embodiment, secure computation calculator 1012 performs, using a secure computation method, encryption processing on history information of a device received from transaction data generator 1011. Secure computation calculator 1012 transmits, to data server 300 via communication unit 1014, encrypted history information which is obtained by encrypting the history information of the device using a secure computation method.

Here, the data on which the encryption processing has been performed using the secure computation method can be subjected to computation processing, including image recognition, without being decrypted. The encryption processing using the secure computation method can be performed using a method disclosed in Non Patent Literature 2 (NDSS Symposium 2015. "ABY—A Framework for Efficient Mixed-Protocol Secure Two-Party Computation") (hereinafter referred to as NPL 2) or Non Patent Literature 3 ("Fully Homomorphic Encryption without Bootstrapping". Retrieved Jul. 20, 2018, from https://eprint.iacr.org/2011/277.pdf) (hereinafter referred to as NPL 3), for example. By encrypting data using the method disclosed in NPL 2 or NPL 3, the four basic arithmetic operations are possible without decrypting the encrypted data, thus enabling computation of a hash value. The method used for the encryption processing may be determined in advance, or may be obtained from data, for example. More than one method may be used for the encryption processing.

<Recorder 1013>

Recorder 1013 records the transaction data generated by transaction data generator 1011 and the encrypted history information which is the data encrypted by secure computation calculator 1012. In the present embodiment, recorder 1013 records the encrypted history information which is the data encrypted by secure computation calculator 1012 and on which secure computation can be performed, and records the transaction data which is generated by transaction data generator 1011 and includes a first hash value.

<Communication Unit 1014>

Communication unit 1014 communicates with data servers 300 and authentication servers 200 via communication network 400. The communication may be performed in accordance with transport layer security (TLS). In such a case, communication unit 1014 may hold an encryption key for the TLS communication.

Next, terminal 110 will be described.

1.4 Configuration of Terminal 110

Figure 5:
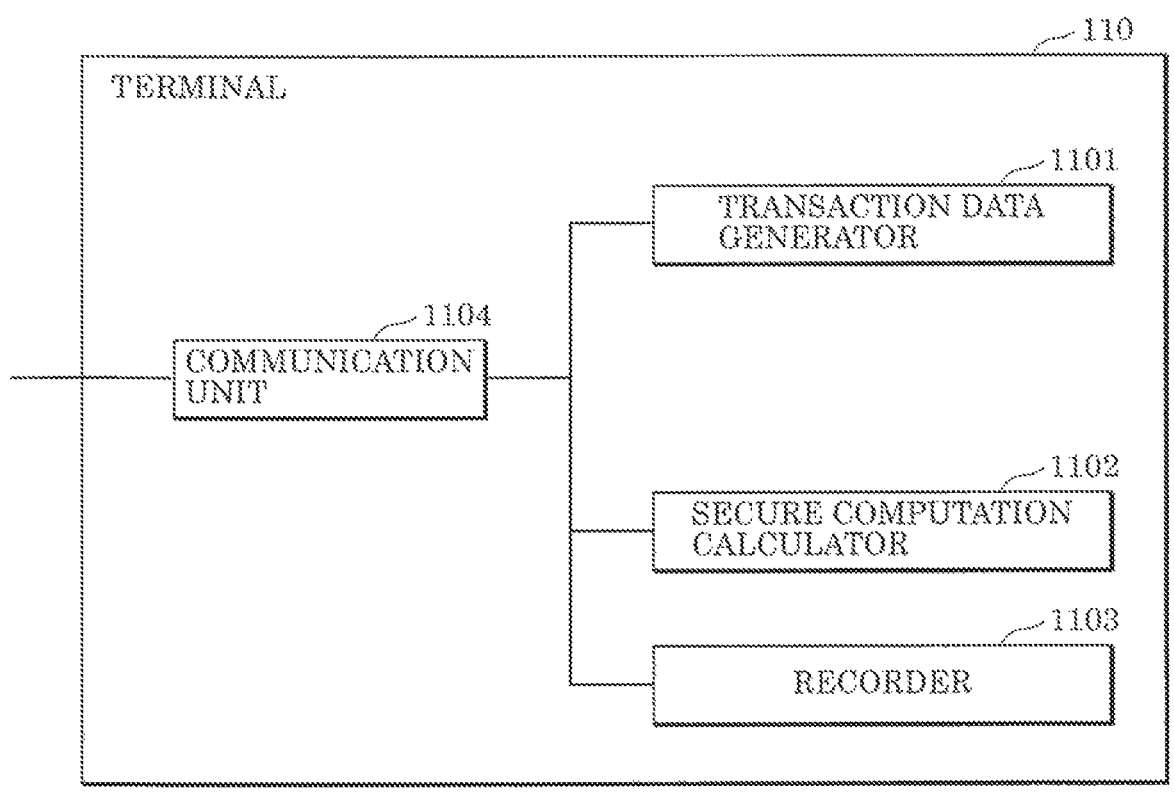
FIG. 5 is a block diagram illustrating an example of the functional configuration of a terminal according to the embodiment.

FIG. 5 is a block diagram illustrating an example of the functional configuration of terminal 110 according to the present embodiment.

Terminal 110 is an example of a device according to the present disclosure, and is realized by a processor executing a given program using memory. Terminal 110 is, for example, a device such as a smartphone including a display and an input unit, or a device such as a wearable device which obtains sensor information of a user.

In the present embodiment, terminal 110 includes, as illustrated in FIG. 5, transaction data generator 1101, secure computation calculator 1102, recorder 1103, and communication unit 1104.

<Transaction Data Generator 1101>

Transaction data generator 1101 generates transaction data for the blockchain based on history information including, for example, a control history of terminal 110 by a user, a history of information entered by the user into terminal 110, and a history of information related to the user collected by terminal 110. The history of information entered by the user into terminal 110 is, for example, a plurality of photos taken by the user in the past using terminal 110. The history of information related to the user collected by terminal 110 is, for example, a history of sensor information such as information indicating the user's body temperature.

In the present embodiment, transaction data generator 1101 computes a hash value (referred also to as a first hash value) of the history information obtained from terminal 110, and generates transaction data including the computed first hash value.

Here, the structure (data structure) of the transaction data generated by transaction data generator 1101 is as illustrated in FIG. 4. That is to say, the data structure of the transaction data generated by transaction data generator 1101 includes a transaction ID, a blockchain address, a first hash value, and a signature.

Note that the blockchain address is, as described above, an identifier for identifying the creator of the transaction data, and enables identification of the user or terminal 110. Transaction data generator 1101 may generate transaction data which includes, in addition to the blockchain address, an identifier for identifying the history information.

Transaction data generator 1101 records the generated transaction data in recorder 1103. Furthermore, transaction data generator 1101 transmits the generated transaction data to at least one authentication server 200 among authentication servers 200a, 200b, and 200c via communication unit 1104.

<Secure Computation Calculator 1102>

Secure computation calculator 1102 generates encrypted history information which is history information of terminal 110 encrypted using a secure computation method which enables computation without decrypting the encrypted history information. In the present embodiment, secure computation calculator 1102 performs encryption processing using a secure computation method on history information of terminal 110 received from transaction data generator 1101 or history information received from transaction data generator 1101 such as a plurality of photos taken in the past and held by terminal 110 or a history of sensor information held by terminal 110. Secure computation calculator 1102 transmits, to data server 300 via communication unit 1104, encrypted history information which is obtained by encrypting history information using a secure computation method.

While the description of the details of the encryption processing using a secure computation method is omitted since the details have been described above, a method disclosed in NPL 2 and/or NPL 3, for example, may be used. The method used for the encryption processing may be determined in advance as described above, or may be obtained from data, for example. More than one method may be used for the encryption processing.

<Recorder 1103>

Recorder 1103 records the transaction data generated by transaction data generator 1101 and the encrypted history information which is the data encrypted by secure computation calculator 1102. In the present embodiment, recorder 1103 records the encrypted history information which is the data encrypted by secure computation calculator 1102 and on which secure computation can be performed, and records the transaction data which is generated by transaction data generator 1101 and includes a first hash value, <Communication Unit 1104>

Communication unit 1104 communicates with data servers 300 and authentication servers 200 via communication network 400. The communication may be performed in accordance with TLS. In such a case, communication unit 1104 may hold an encryption key for the TLS communication.

Next, vehicle 120 will be described.

1.5 Configuration of Vehicle 120

Vehicle 120 is an automobile, for example, but is not limited to this. Vehicle 120 may be a motorcycle, a ship, or the like. That is to say, vehicle 120 etc. may be any vehicle so long as a plurality of electrical control units (ECUs) are connected to a network in vehicle 120.

Figure 6:
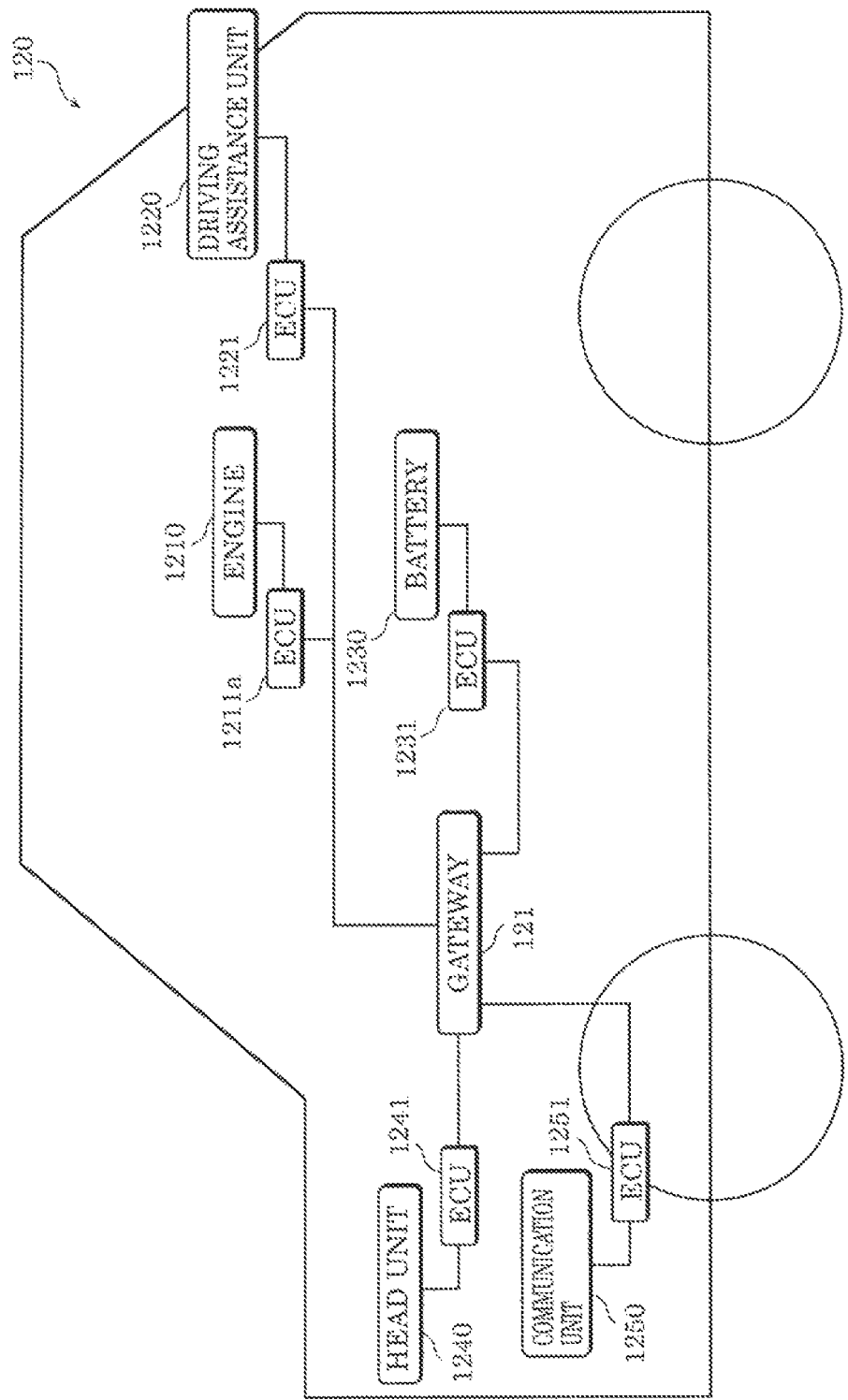
FIG. 6 illustrates an example of the overall configuration of an in-vehicle network system in a vehicle according to the embodiment.

FIG. 6 illustrates an example of the overall configuration of an in-vehicle network system in vehicle 120 according to the present embodiment.

The plurality of electrical control units, namely, ECU 1211a, ECU 1221, ECU 1231, ECU 1241, and ECU 1251 and gateway 121 are connected via the in-vehicle network. Here, the in-vehicle network may be a controller area network (CAN), Ethernet®, or a mixture of CAN and Ethernet®. Note that even when the in-vehicle network includes Ethernet®, a message may be broadcast.

For example, engine 1210, battery 1230, a motor (not illustrated), and a drive ECU related to fuel control are connected to the in-vehicle network. In the example illustrated in FIG. 6, ECU 1211a for engine 1210 and ECU 1231 for battery 1230 are connected to the in-vehicle network.

Driving assistance unit 1220 and a safety and comfort function ECU (not illustrated) such as an automatic brake, lane keeping, inter-vehicle distance function, collision avoidance function, and an airbag are connected to the in-vehicle network. In the example illustrated in FIG. 6, ECU 1221 for driving assistance unit 1220 is connected to the in-vehicle network.

An infotainment ECU such as head unit 1240 is also connected to the in-vehicle network. In the example illustrated in FIG. 6, ECU 1241 for head unit 1240 is connected to the in-vehicle network. Note that ECU 1241 for head unit 1240 need not be included, and head unit 1240 may be directly connected to the in-vehicle network without ECU 1241 in between. The head unit includes a display and an input unit, and has a function to display a screen to, and receive an input of information from, the user present in vehicle 120, i.e., a car.

A communication ECU such as communication unit 1250 having a communication function to communicate with authentication servers 200 is connected to the in-vehicle network. In the example illustrated in FIG. 6, ECU 1251 for communication unit 1250 is connected to the in-vehicle network.

Note that ECU 1211a to ECU 1251 described above may be integrally formed with, that is, configured as one component with, the respective components to which ECU 1211a to ECU 1251 are connected. For example, engine 1210 and ECU 1211a which is for engine 1210 and is connected to engine 1210 may be configured as one component. The same applies to the other ECUs.

These electrical control units, namely, ECU 1211a to ECU 1251, regularly or irregularly transmit a message. For example, ECU 1211a for engine 1210 obtains the number of revolutions of engine 1210, and regularly transmits a message indicating the number of revolutions of engine 1210 obtained. Furthermore, for example, with ECU 1221 for driving assistance unit 1220, when the driving assistance function is turned on, ECU 1221 transmits a message indicating that the driving assistance function is turned on. When a new ECU is connected to the in-vehicle network, a message may be transmitted indicating that a new ECU is connected to the in-vehicle network.

Next, gateway 121 connected to the in-vehicle network will be described.

1.6 Configuration of Gateway 121

Figure 7:
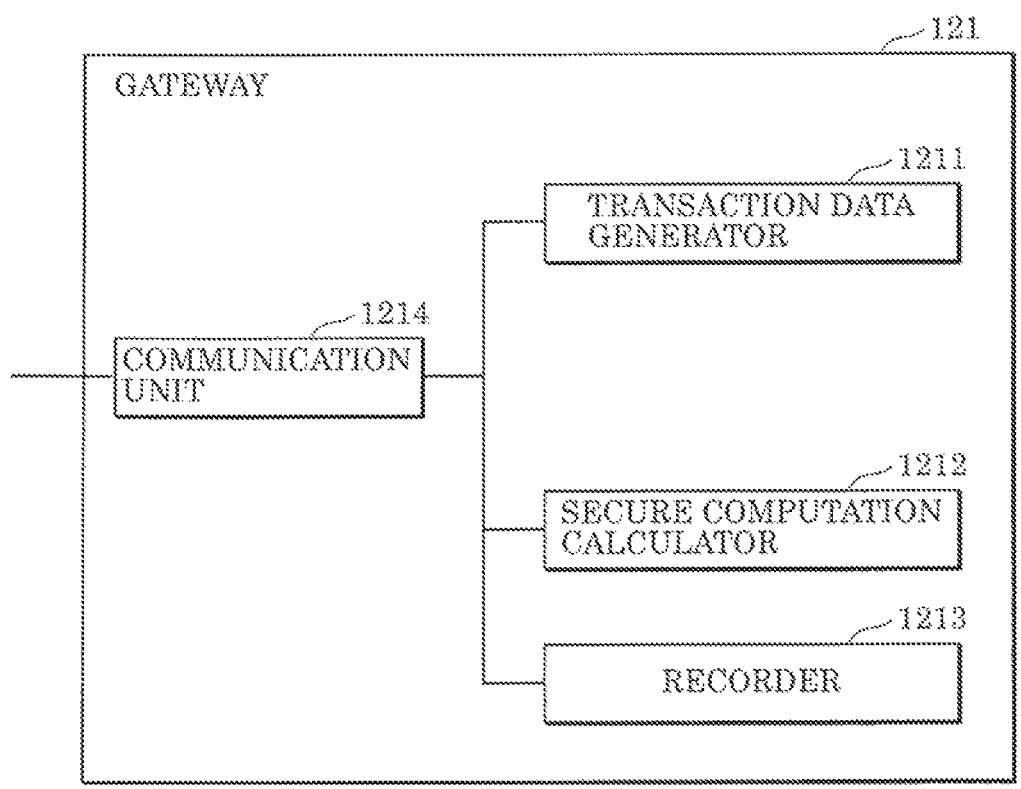
FIG. 7 is a block diagram illustrating an example of the functional configuration of a gateway illustrated in FIG. 5.

FIG. 7 is a block diagram illustrating an example of the functional configuration of gateway 121 illustrated in FIG. 6.

Gateway 121 is realized as a result of a processor executing a given program using memory. In the present embodiment, gateway 121 includes, as illustrated in FIG. 7, transaction data generator 1211, secure computation calculator 1212, recorder 1213, and communication unit 1214.

<Transaction Data Generator 1211>

Transaction data generator 1211 generates transaction data for the blockchain based on history information of vehicle 120 including, for example, a manual driving history or a self-driving history of vehicle 120 and a history of sensor information of vehicle 120.

In the present embodiment, transaction data generator 1211 computes a hash value (referred to as a first hash value) of the history information obtained from vehicle 120, and generates transaction data including the computed first hash value.

Here, the structure (data structure) of the transaction data generated by transaction data generator 1211 is as illustrated in FIG. 4. That is to say, the data structure of the transaction data generated by transaction data generator 1211 includes a transaction ID, a blockchain address, a first hash value, and a signature.

Note that the blockchain address is, as described above, an identifier for identifying the creator of the transaction data, and enables identification of the user of vehicle 120, gateway 121, or vehicle 120. As described above, transaction data generator 1211 may generate transaction data which includes, in addition to the transaction ID, an identifier for identifying the history information.

Transaction data generator 1211 records the generated transaction data in recorder 1213. Furthermore, transaction data generator 1211 transmits the generated transaction data to at least one authentication server 200 among authentication servers 200a, 200b, and 200c via communication unit 1214.

<Secure Computation Calculator 1212>

Secure computation calculator 1212 generates encrypted history information which is history information of vehicle 120 encrypted using a secure computation method which enables computation without decrypting the encrypted history information. In the present embodiment, secure computation calculator 1212 performs encryption processing using a secure computation method on history information received from transaction data generator 1211, such as a driving history of vehicle 120 and a history of sensor information. Secure computation calculator 1212 transmits, to data server 300 via communication unit 1214, encrypted history information which is obtained by encrypting the history information using a secure computation method.

While the description of the details of the encryption processing using a secure computation method is omitted since the details have been described above, a method disclosed in NPL 2 and/or NPL 3, for example, may be used.

The method used for the encryption processing may be determined in advance as described above, or may be obtained from data, for example.

<Recorder 1213>

Recorder 1213 records the transaction data generated by transaction data generator 1211 and the encrypted history information which is the data encrypted by secure computation calculator 1212. In the present embodiment, recorder 1213 records the encrypted history information which is the data encrypted by secure computation calculator 1212 and on which secure computation can be performed, and records the transaction data which is generated by transaction data generator 1211 and includes a first hash value.

<Communication Unit 1214>

Communication unit 1214 communicates with data servers 300 and authentication servers 200 via communication network 400. The communication may be performed in accordance with TLS. In such a case, communication unit 1214 may hold an encryption key for the TLS communication.

Next, authentication server 200a etc. will be described.

1.7 Configuration of Authentication Server 200a

Figure 8:
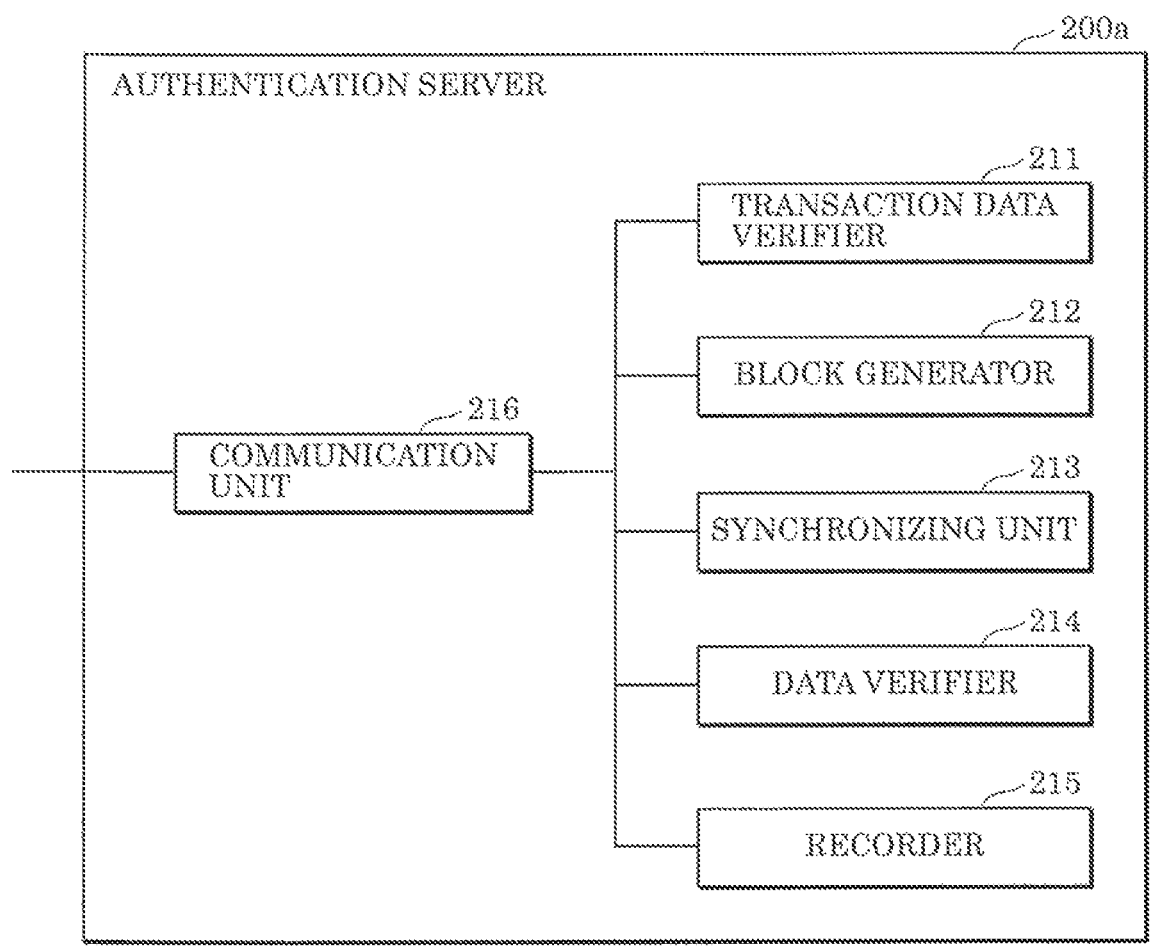
FIG. 8 is a block diagram illustrating an example of the functional configuration of an authentication server according to the embodiment.

FIG. 8 is a block diagram illustrating an example of the functional configuration of authentication server 200a according to the present embodiment. Authentication servers 200b and 200c have the same configuration as authentication server 200a, and thus authentication server 200a is taken as an example in the following description.

As illustrated in FIG. 8, authentication server 200a includes transaction data verifier 211, block generator 212, synchronizing unit 213, data verifier 214, recorder 215, and communication unit 216. Authentication server 200a can be realized as a result of a processor executing a given program using memory. Hereinafter, each structural element will be described.

<Transaction Data Verifier 211>

Transaction data verifier 211 verifies the transaction data received. Specifically, when transaction data verifier 211 receives the transaction data from a device such as home 100, terminal 110, or vehicle 120, transaction data verifier 211 verifies whether the format of the transaction data is proper and whether the signature is valid. By verifying the validity of the received transaction data in such a manner, transaction data verifier 211 verifies the transaction data.

If the result of the verification shows that the transaction data is valid, transaction data verifier 211 records the transaction data in recorder 215 and transfers the transaction data to synchronizing unit 213.

<Block Generator 212>

When the validity of the transaction data is verified successfully by transaction data verifier 211, block generator 212 executes a consensus algorithm related to the transaction data among a plurality of authentication servers. Here, the consensus algorithm may be a consensus algorithm called practical byzantine fault tolerance (PBFT), or any other publicly known consensus algorithm.

In such a manner as described, in the present embodiment, block generator 212 executes the consensus algorithm among authentication servers 200a, 200b, and 200c. Specifically, block generator 212 first generates a block of a blockchain including one or more items of transaction data. Next, block generator 212 executes the consensus algorithm. If a consensus is reached through the execution of the consensus algorithm, block generator 212 records the generated block in recorder 215. The block generated by block generator 212 is recorded by being connected to the blockchain recorded in recorder 215.

Here, a data structure of the blockchain and a data structure of a part of the transaction data included in the blockchain will be described.

Figure 9:
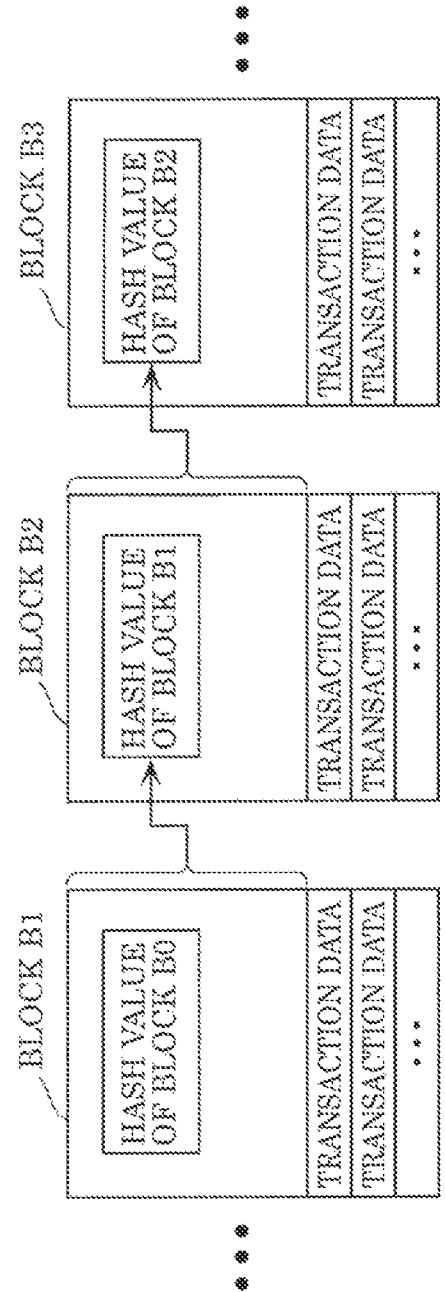
FIG. 9 is an explanatory diagram illustrating a data structure of the blockchain.

FIG. 9 is an explanatory diagram illustrating a data structure of the blockchain.

The blockchain is a chain of blocks each of which is the unit of recording. Each block includes a plurality of items of transaction data and a hash value of the immediately preceding block. Specifically, block B2 includes a hash value of preceding block B1. A hash value calculated based on (i) a plurality of items of transaction data included in block B2 and (ii) the hash value of block B1 is included in block B3 as the hash value of block B2. Connecting blocks like a chain while including the content of the preceding block as a hash value in such a manner effectively prevents tampering with the transaction data included in the connected blocks.

If past transaction data stored in a block of the blockchain is modified, the hash value of the block changes from the hash value before the modification. To make the tampered block look genuine, all the subsequent blocks must be remade, which is very difficult in reality.

<Synchronizing Unit 213>

Synchronizing unit 213 synchronizes the blocks or the transaction data of the blockchain among the plurality of authentication servers (authentication servers 200a to 200c).

Synchronizing units 213 of the plurality of authentication servers 200a to 200c synchronize the transaction data of the blockchain in a peer-to-peer manner. Each synchronizing unit 213 records the synchronized transaction data of the blockchain in recorder 215.

For example, when transaction data verifier 211 verifies the validity of the transaction data, synchronizing unit 213 transfers the verified transaction data to other authentication servers 200b and 200c. When synchronizing unit 213 receives the verified transaction data from other authentication servers 200, synchronizing unit 213 records the received, verified transaction data in recorder 215.

<Data Verifier 214>

Data verifier 214 transmits a verification request to request verification of encrypted history information which is data recorded in data server 300, and receives, from data server 300, a hash value obtained from the encrypted history information targeted for data verification. More specifically, data verifier 214 generates transaction data which indicates a request for data verification and includes identification information for identifying encrypted history information. Here, the encrypted history information is history information of the device which is targeted for data verification. Data verifier 214 then transmits the generated transaction data to data server 300. Data verifier 214 then obtains, from data server 300, a hash value computed through computation processing performed on the encrypted history information without decrypting the encrypted history information. Here, the encrypted history information is identified by the identification information from among one or more items of encrypted history information recorded in data server 300.

Data verifier 214 verifies whether or not the hash value obtained from data server 300 matches the hash value obtained from the history information of the device which is recorded in recorder 215 and targeted for the data verification.

Note that when making a request for verification of the encrypted history information, data verifier 214 transmits, to data server 300, transaction data including identification information for identifying the encrypted history information; however, the present disclosure is not limited to this. Data verifier 214 may transmit the identification information only, or may transmit transaction data which indicates a request for verification of data and includes, instead of the identification information, information indicating the attribute type of the data. This enables identification of the encrypted history information targeted for the data verification.

<Recorder 215>

Recorder 215 includes transaction data into a block, and records the block in the blockchain in the distributed ledger of storage device 201a. Storage device 201a may be provided inside recorder 215, or may be provided outside authentication server 200a as illustrated in FIG. 1.

The transaction data includes transaction data received from home 100, terminal 110, or vehicle 120.

In the present embodiment, recorder 215 records the transaction data received from the device in the distributed ledger, when the validity of the transaction data is verified and the hash value recorded in recorder 215 and the hash value obtained from data server 300 match.

<Communication Unit 216>

Communication unit 216 performs communication with home 100, terminal 110, vehicle 120, authentication servers 200b and 200c, and data servers 300a, 300b, and 300c. The communication may be performed in accordance with TLS. In such a case, communication unit 216 may hold an encryption key for the TLS communication.

In the present embodiment, communication unit 216 receives transaction data which is generated by a device and includes a hash value obtained from history information of the device. Moreover, communication unit 216 obtains, from data server 300, a hash value computed by data server 300 performing computation processing on encrypted history information without decrypting the encrypted history information. Here, the encrypted history information is history information of the device encrypted using a secure computation method which enables computation without decrypting the encrypted history information. The encrypted history information is obtained from the device and recorded in data server 300.

Next, data server 300a etc. will be described.

1.8 Configuration of Data Server 300a

Figure 10:
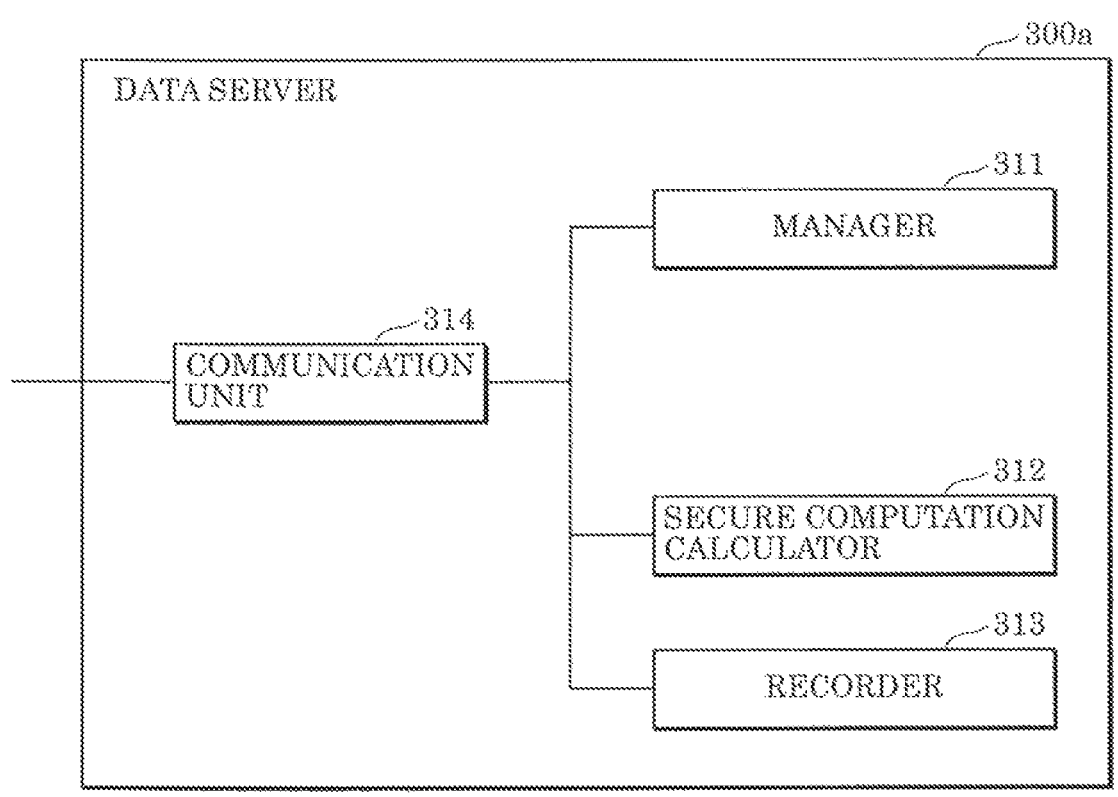
FIG. 10 is a block diagram illustrating an example of the functional configuration of a data server according to the embodiment.

FIG. 10 is a block diagram illustrating an example of the functional configuration of data server 300a according to the present embodiment. Data servers 300b and 300c have the same configuration as data server 300a, and thus data server 300a is taken as an example in the following description.

As illustrated in FIG. 10, data server 300a includes manager 311, secure computation calculator 312, recorder 313, and communication unit 314.

<Manager 311>

Manager 311 records, in recorder 313, encrypted history information which is encrypted data received from a device such as home 100, terminal 110, or vehicle 120.

When manager 311 receives, from authentication server 200, a request for verification of encrypted history information which is the data recorded in recorder 313, manager 311 transmits the encrypted history information targeted for the data verification to secure computation calculator 312. More specifically, based on an identifier or information indicating the attribute type assigned to the verification request, manager 311 transmits, to secure computation calculator 312, a request for performing hash value calculation processing through secure computation on the encrypted history information which is recorded in recorder 313 and targeted for the data verification.

Manager 311 receives, from secure computation calculator 312, a hash value of the encrypted history information targeted for the data verification, and transmits the hash value to authentication server 200.

<Secure Computation Calculator 312>

When secure computation calculator 312 receives, from manager 311, the request for performing hash value calculation processing through secure computation on the encrypted history information targeted for the data verification, secure computation calculator 312 calculates a hash value by performing secure computation using the encrypted history information targeted for the data verification and recorded in recorder 313. Note that secure computation calculator 312 may perform secure computation in cooperation with other data servers 300b and 300c to calculate the hash value of the encrypted history information which is the encrypted data targeted for the data verification. The hash value calculation processing through secure computation may be performed using a method disclosed in NPL 2 and/or NPL 3.

Secure computation calculator 312 transmits the calculated hash value to manager 311.

<Recorder 313>

Recorder 313 records encrypted history information which is the encrypted data received from a device such as home 100, terminal 110, or vehicle 120.

<Communication Unit 314>

Communication unit 314 communicates with authentication servers 200a, 200b, and 200c. The communication may be performed in accordance with TLS. In such a case, communication unit 314 may hold an encryption key for the TLS communication.

1.9 Overall Sequence of Data Protection Between Home, Authentication Servers, and Data Servers The following describes a sequence of data protection between home 100, authentication servers 200a to 200c, and data servers 300a to 300c.

Figure 11:
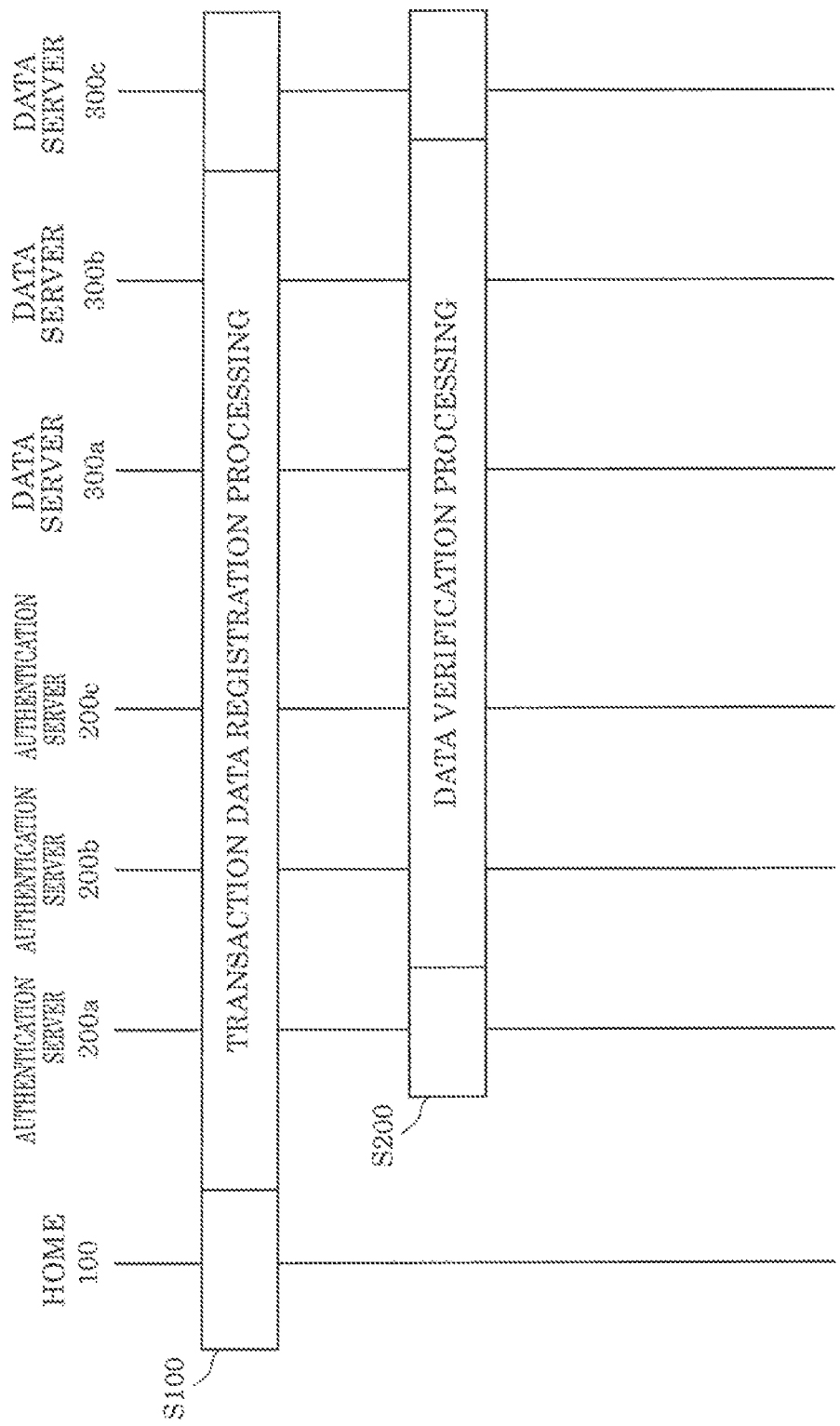
FIG. 11 is an overall sequence diagram illustrating data protection according to the embodiment.

FIG. 11 is an overall sequence diagram illustrating data protection according to the present embodiment. Each process will be described below. Note that home 100 illustrated in FIG. 11 may be terminal 110 or vehicle 120. Home 100, terminal 110, and vehicle 120 are examples of a device according to the present disclosure.

First, in Step S100, transaction data registration processing is performed between home 100, authentication servers 200a, 200b, and 200c, and data servers 300a, 300b, and 300c. Next, in Step S200, data verification processing is performed between authentication servers 200a, 200b, and 200c and data servers 300a, 300b, and 300c.

Note that the data verification processing may be performed regularly, or may be performed after a certain period following the transaction data registration processing, or may be performed after the transaction data registration processing is performed twice or more.

1.9.1 Transaction Data Registration Processing Between Home and Authentication Servers The following describes the transaction data registration processing performed between home 100 and authentication servers 200a, 200b, and 200c.

Figure 12:
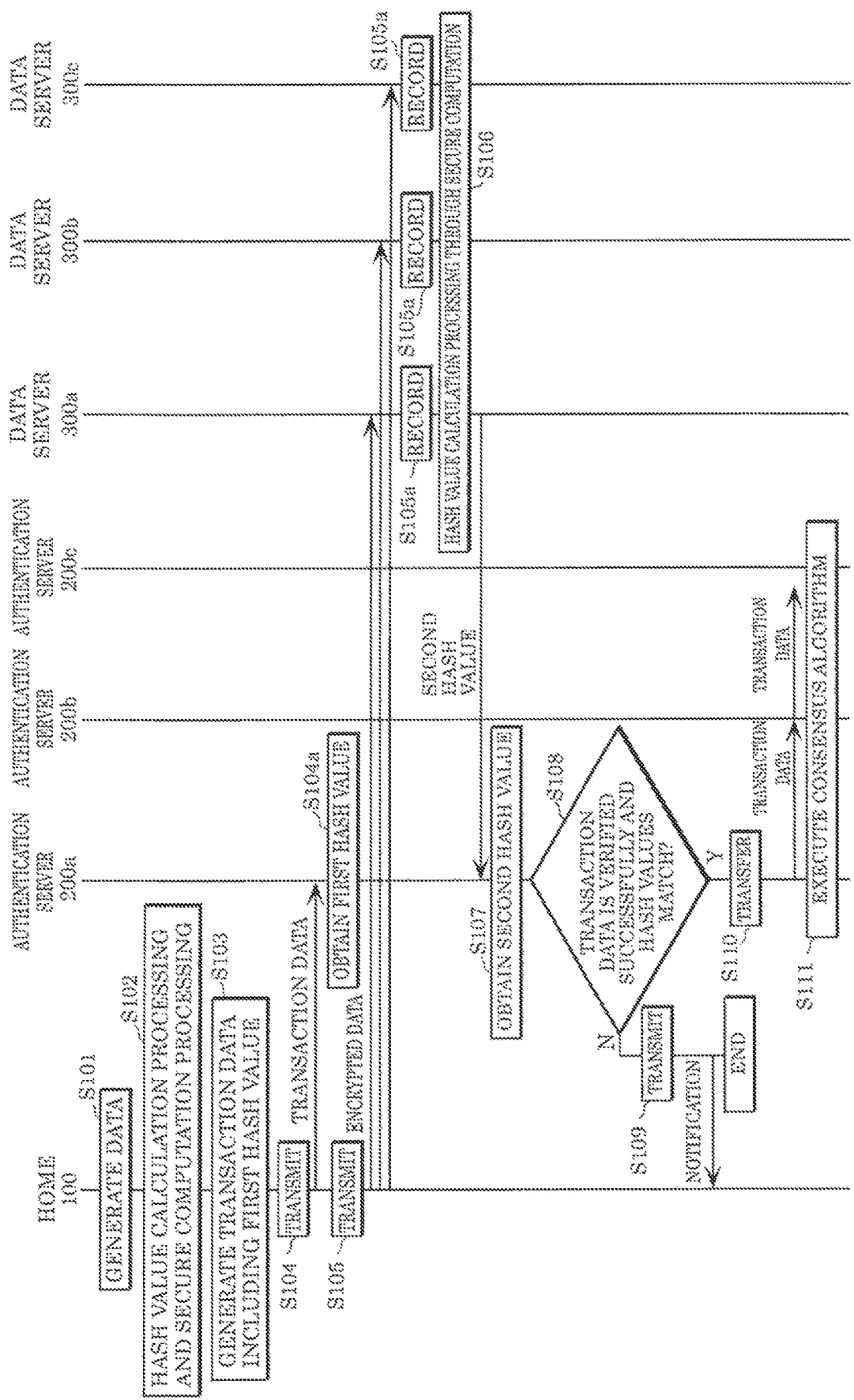
FIG. 12 is a sequence diagram illustrating transaction data registration processing according to the embodiment.

FIG. 12 is a sequence diagram illustrating the transaction data registration processing according to the present embodiment. In FIG. 12, transaction data is registered by home 100 as an example of the device according to the present disclosure; however, the present disclosure is not limited to this. The transaction data may be registered by terminal 110 or vehicle 120. The same sequence applies even when the transaction data is registered by terminal 110 or vehicle 120.

First, in Step S101, controller 101 of home 100 obtains, for example, history information of a home device, and generates data which serves as the base of transaction data. For example, home 100 obtains history information such as a control history of a home device in the home, the amount of power generated by solar photovoltaic power generation equipment 102, or the amount of power output from accumulator battery 103, and generates data which serves as the base of transaction data.

Next, in Step S102, controller 101 of home 100 performs secure computation processing, that is, encryption processing using a secure computation method, on data such as the history information obtained in Step S1.01. Authentication servers 200a, 200b, and 200c, data servers 300a, 300b, and 300c, and controller 101 of home 100 may adopt the same secure computation method in advance, or data protection system 10 may determine a secure computation in advance.

Next, in Step S103, controller 101 of home 100 generates transaction data using a hash value of the history information computed through the hash value calculation processing in Step S102 (hereinafter referred to as a first hash value).

More specifically, controller 101 generates transaction data which includes the first hash value obtained from the history information of the device. Here, the transaction data includes a transaction ID, a blockchain address, and a signature other than the first hash value, as described above.

Next, in Step S104, controller 101 of home 100 transmits, to authentication server 200a, the transaction data including the first hash value, generated in Step S103. Authentication server 200a receives the transaction data including the first hash value, and obtains the first hash value (S104a). Note that in the example illustrated in FIG. 12, controller 101 of home 100 transmits the generated transaction data to authentication server 200a; however, controller 101 of home 100 may transmit the generated transaction data to authentication server 200b or authentication server 200c. This is because the processing is the same even when controller 101 of home 100 transmits the generated transaction data to authentication server 200b or authentication server 200c.

Next, in Step S105, controller 101 of home 100 transmits, to data servers 300a to 300c, the encrypted history information which is the encrypted data obtained through the secure computation processing in Step S102. Data servers 300a to 300c each receive and record the encrypted history information (S105a).

Next, in Step S106, data servers 300a to 300c perform hash value calculation processing through secure computation on the encrypted history information which is the encrypted data received, so as to calculate a hash value (hereinafter referred to as a second hash value). Data server 300a transmits the calculated second hash value to authentication server 200a.

Note that although FIG. 12 illustrates an example where the secure computation is cooperatively performed by a plurality of data servers 300 (data servers 300a to 300c) to calculate the second hash value, the secure computation may be performed by at least one data server 300 to calculate the second hash value.

Next, in Step S107, authentication server 200a obtains the second hash value transmitted from data server 300a. In other words, authentication server 200a obtains, from data server 300a, the second hash value computed by data server 300a etc. performing computation processing on the encrypted history information without decrypting the encrypted history information. Here, the encrypted history information is history information of a device encrypted using a secure computation method which enables computation without decrypting the encrypted history information. The encrypted history information is obtained from the device and recorded in data server 300a etc.

Next, in Step S108, authentication server 200a verifies the transaction data received from home 100, and determines whether the hash value obtained from home 100 matches the hash value obtained from data server 300a. In other words, authentication server 200a verifies the transaction data and determines whether the first hash value and the second hash value match.

When the verification of the transaction data is not successful or when the obtained first hash value and second hash value do not match in Step S108 (N in S108), authentication server 200a transmits a notification to home 100 indicating that the verification of the transaction data was not successful or the first hash value and the second hash value did not match (S109), and ends the processing.

On the other hand, when the verification of the transaction data is successful and the obtained first hash value and second hash value match in Step S108 (Y in S108), authentication server 200a transfers the transaction data to other authentication servers 200 (authentication servers 200b and 200c) (S110). Note that authentication servers 200b and 200c also verify the transaction data received.

Next, in Step S111, authentication servers 200a, 200b, and 200c execute a consensus algorithm. When authentication servers 200a, 200b, and 200c verify that the transaction data received is valid transaction data (that is, when the validity of the transaction data is verified), each of authentication servers 200a, 200b, and 200c generates a block including the transaction data. Then, authentication servers 200a, 200b and 200c record the blocks including the transaction data in the distributed ledgers of storage devices 201a, 201b, and 201c, respectively. In other words, authentication server 200a records the transaction data in the distributed ledger in synchronization with authentication servers 200b and 200c, that is, authentication servers 200 excluding authentication server 200a, when the validity of the transaction data received from home 100 is verified and the first hash value and the second hash value match.

1.9.2 Data Verification Processing Between Data Servers and Authentication Servers The following describes data verification processing performed between data servers 300 and authentication servers 200a, 200b, and 200c.

Figure 13:
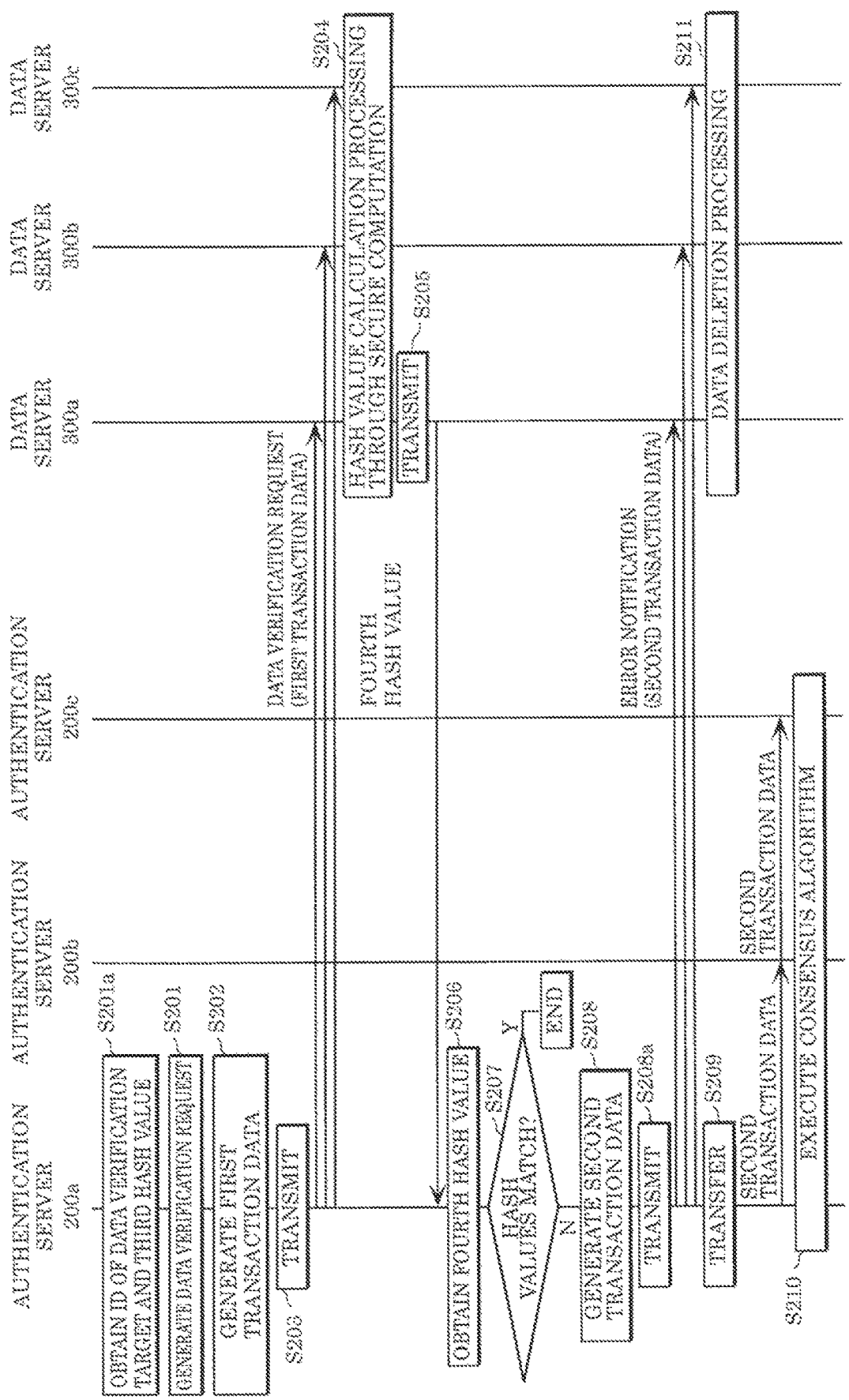
FIG. 13 is a sequence diagram illustrating data verification processing according to the embodiment.

FIG. 13 is a sequence diagram illustrating the data verification processing according to the present embodiment. In FIG. 13, authentication server 200a makes a data verification request and performs the data verification processing; however, authentication server 200b or authentication server 200c may make a data verification request and perform the data verification processing. The processing is the same even when authentication server 200b or authentication server 200c makes a data verification request and performs the data verification processing.

First, in Step S201a, authentication server 200a obtains, from transaction data recorded in the distributed ledger or from transaction data transmitted by a device, (i) identification information (ID) that identifies encrypted history information which is history information of the device that is targeted for the data verification and (ii) a hash value obtained from the history information (hereinafter referred to as a third hash value).

Next, in Step S201, authentication server 200a makes a data verification request to request for verification of the history information of the device targeted for the data verification. Specifically, authentication server 200a selects the history information targeted for the data verification, based on, for example, the identification information included in the obtained transaction data, and generates a data verification request.

Next, in Step S202, authentication server 200a generates transaction data which indicates the data verification request for verification of the target history information (hereinafter referred to as first transaction data). For example, authentication server 200a generates first transaction data which includes a transaction ID, a signature, and identification information that identifies the encrypted history information which is the history information of the device targeted for the data verification.

Next, in Step S203, authentication server 200a transmits, to data servers 300a to 300c, the first transaction data generated in Step S202 and indicating the data verification request.

Next, in Step S204, data servers 300a to 300c cooperatively perform hash value calculation processing through secure computation on the encrypted history information targeted for the data verification, based on the first transaction data received from authentication server 200a. Note that the hash value calculation processing through secure computation is not limited to the case of being cooperatively performed by a plurality of data servers 300, and may be performed by at least one data server 300.

Next, in Step S205, data server 300a transmits, to authentication server 200a, a hash value calculated by performing the hash value calculation processing through secure computation on the encrypted history information targeted for the data verification (hereinafter referred to as a fourth hash value).

Next, in Step S206, authentication server 200a obtains the fourth hash value from data server 300a. In other words, authentication server 200a obtains, from data server 300a, the fourth hash value computed by performing computation processing on the encrypted history information without decrypting the encrypted history information. Here, the encrypted history information on which the computation processing is performed is identified by the identification information from among one or more items of encrypted history information recorded in data server 300a etc.

Next, in Step S207, authentication server 200a verifies whether the third hash value obtained in Step S201a and the fourth hash value obtained in Step S206 match.

When the third hash value and the fourth hash value match in Step S207 (Y in S207), authentication server 200a ends the processing, determining that the data verification was successful. On the other hand, when the third hash value and the fourth hash value do not match in Step S207 (N in S207), authentication server 200a generates transaction data for making a data deletion request, determining that the data verification was not successful (S208). The transaction data for making a data deletion request is hereinafter referred to as second transaction data. In other words, when the third hash value and the fourth hash value do not match, authentication server 200a generates second transaction data which includes identification information and indicates a deletion request for deletion of encrypted information identified by the identification information.

In Step S208a, authentication server 200a transmits the second transaction data generated in Step S208 to data servers 300a to 300c as error notification (S208a).

In Step S209, authentication server 200a transfers the second transaction data generated in Step S208 to other authentication servers 200 (authentication servers 200b and 200c).

Next, in Step S210, authentication servers 200a, 200b, and 200c execute a consensus algorithm. When authentication servers 200a, 200b, and 200c verify that the transaction data received is valid transaction data (that is, when the validity of the transaction data is verified), each of authentication servers 200a, 200b, and 200c generates a block including the transaction data. Then, authentication servers 200a, 200b, and 200c record the blocks including the transaction data in the distributed ledgers of storage devices 201a, 201b, and 201c, respectively. In other words, authentication server 200a records the second transaction data in the distributed ledger in synchronization with authentication servers 200b and 200c, that is, authentication servers 200 excluding authentication server 200a, when the third hash value and the fourth hash value do not match.

In Step S211, data servers 300a to 300c perform data deletion processing based on the data deletion request received from authentication server 200a.

1.10 Advantageous Effects of Embodiment

In the present embodiment, encrypted data is obtained by encrypting personal data, such as history information of a device, e.g., home 100, terminal 110, or vehicle 120, using a method which enables secure computation, and the encrypted data is recorded in a data server. Moreover, in the present embodiment, transaction data which only includes a hash value of the encrypted data is recorded in a distributed ledger.

This makes it possible to, not only effectively reduce tampering with the encrypted data, but also protect the privacy of personal data without leakage of the personal data even when the transaction data included in a block of a blockchain is made public. Moreover, with use of the secure computation, the personal data recorded in a data server can be used without being decrypted.

Where necessary, the personal data recorded in the data server can be verified by making a comparison between the hash value of the encrypted data obtained through secure computation and the hash value included in the transaction data recorded in the distributed ledger.

This enables verification of the personal data recorded in the data server, without leakage of the personal data.

As a result, since the user's privacy is protected even when the user provides personal data, the user can more easily provide personal data. That is to say, the user can more easily provide data servers 300 with transaction data which includes encrypted data that is encrypted using a method capable of secure computation.

In such a manner as described, with use of the blockchain technology, it is possible to configure a safe system capable of, not only effective reduction of tampering with personal data, but also usage of data, including data verification, while protecting the privacy of the personal data.

2. Other Variations

Although the present disclosure has been described based on the above embodiment, the present disclosure is not limited to the above embodiment. Such cases as below are also encompassed by the present disclosure.

(1) In the above embodiment, authentication servers 200 and data servers 300 have been described as different devices; however, authentication servers 200 and data servers 300 may be one and the same device.

(2) In the above embodiment, when the verification of transaction data has failed, authentication server 200 notifies home 100, terminal 110, or vehicle 120 of the failure; however, authentication server 200 may also notify data servers 300 of the failure. At this time, data servers 300 delete the encrypted data received.

(3) A plurality of data servers 300 may collaboratively perform the secure computation processing as described in the above embodiment. Alternatively, one data server 300 may perform the secure computation processing based on an existing secure computation encryption method.

(4) In the above embodiment, the encryption processing performed through secure computation may employ a plurality of encryption methods. This makes it possible to support various types of computations.

(5) In the above embodiment, home 100, terminal 110, and vehicle 120 obtain encrypted history information by encrypting history information, and transmit the encrypted history information to data servers 300. However, a plurality of data servers 300 may cooperatively use a secure computation encryption method capable of decryption. Here, the encrypted data recorded in data servers 300 may be decrypted based on a request from authentication server 200 and permission from the user of home 100, terminal 110, or vehicle 120. This enables decryption of the history information and the like when necessary, thus allowing usage of data.

(6) In the above embodiment, home 100, terminal 110, and vehicle 120 obtain encrypted history information by encrypting history information, and transmit the encrypted history information to data servers 300. The present disclosure, however, is not limited to this. Home 100, terminal 110, or vehicle 120 may receive and decrypt the encrypted history information recorded in data servers 300 to perform tampering verification. If tampering is detected as a result of the verification, authentication servers 200 or data servers 300 may be notified that tampering has been detected. Accordingly, since data servers 300 record the encrypted history information, that is, the encrypted data, the device such as home 100 need not hold the encrypted data. Moreover, when home 100, terminal 110, or vehicle 120 has received and decrypted the encrypted data recorded in data servers 300 and performed tampering verification, a token may be issued to home 100, terminal 110, or vehicle 120 which has performed the tampering verification. At this time, the token may be issued by authentication server 200 or data server 300, or a token possessed by authentication server 200 or data server 300 may be transmitted.

(7) In the above embodiment, when the data verification performed in Step S108 is not successful, data servers 300 may be notified that the data verification was not successful, and the encrypted data recorded in data servers 300 may be deleted.

(8) In the above embodiment, authentication server 200 generates a data verification request and data servers 300 calculate a hash value; however, the present disclosure is not limited to this. Data servers 300 may regularly or irregularly perform the hash value calculation processing, and make a data verification request by notifying authentication server 200 of a hash value computed through the hash value calculation processing.

(9) In the above embodiment, the blockchain recorded by authentication servers 200 may be made public to home 100, terminal 110, and vehicle 120.

(10) In addition, the present disclosure also encompasses a data structure used for a block recorded in the blockchain in data protection system 10 according to the above embodiment. More specifically, a data structure according to the present disclosure includes: a blockchain address which is an identifier for identifying a creator of transaction data included in a block of a blockchain; a transaction ID for identifying the transaction data; a first hash value which is included in the transaction data and obtained from history information of a device; and an electronic signature of a user of the transaction data. The transaction data is included in the block when the first hash value and a second hash value match, the second hash value being computed by data server 300 performing computation processing on encrypted history information without decrypting the encrypted history information, the encrypted history information being obtained from the device and being history information of the device encrypted using a secure computation method which enables computation without decrypting the encrypted history information.

(11) Each of the devices according to the above embodiment is, specifically, a computer system including a microprocessor, read-only memory (ROM), random-access memory (RAM), a hard disk unit, a display unit, a keyboard, a mouse, etc. A computer program is recorded in the RAM or the hard disk unit. Each of the devices achieves its function as a result of the microprocessor operating according to the computer program. Here, the computer program is configured by combining a plurality of instruction codes indicating instructions for the computer in order to achieve a given function.

(12) A portion or all of the structural elements of each device according to the above embodiment may be configured from one system large-scale integration (LSI). A system LSI is a super-multifunction LSI manufactured with a plurality of components integrated on a single chip, and specifically is a computer system including a microprocessor, ROM, and RAM, for example. A computer program is recorded in the RAM. The system LSI achieves its function as a result of the microprocessor operating according to the computer program.

Each structural element of each of the devices described above may be implemented in a single chip individually, or in a single chip that includes some or all of them.

The name used here is system LSI, but it may also be called integrated circuit (IC), LSI, super LSI, or ultra LSI depending on the degree of integration. Moreover, the method of circuit integration is not limited to LSI. Integration may be realized with a specialized circuit or a general purpose processor. After manufacturing the LSI circuit, a field programmable gate array (FPGA) or a reconfigurable processor that allows reconfiguration of the connection or setting of the inner circuit cells of the LSI circuit can be used.

Furthermore, when advancement in semiconductor technology or derivatives of other technologies brings forth a circuit integration technology which replaces LSI, it will be appreciated that such a circuit integration technology may be used to integrate the functional blocks. Application of biotechnology is one such possibility.

(13) A portion or all of the structural elements of each of the devices described above may each be configured as an IC card that is detachably attached to each device, or as a stand-alone module. The IC card and the module are computer systems configured from a microprocessor, ROM, and RAM, for example. The IC card and the module may also include the super-multifunction LSI described above. The IC card and the module achieve their function as a result of the microprocessor operating according to a computer program. The IC card and the module may be tamperproof.

(14) The present disclosure may be realized as the methods described above. The present disclosure may be a computer program realizing these methods using a computer, or a digital signal including the computer program.

Furthermore, the present disclosure may also be realized as the computer program or the digital signal recorded on a computer-readable recording medium such as a flexible disk, hard disk, CD-ROM, a magneto-optical disk (MO), a digital versatile disc (DVD), DVD-ROM, DVD-RAM, a Blu-ray disc (BD), or a semiconductor memory. The present disclosure may also be realized as the digital signal recorded on these recording media.

Moreover, the present disclosure may also be realized by transmitting the computer program or the digital signal via, for example, an electric communication line, a wireless or wired communication line, a network such as the Internet, or data broadcasting.

Moreover, the present disclosure may be realized as a computer system including (i) memory having the computer program recorded thereon, and (ii) a microprocessor that operates according to the computer program.

Moreover, the computer program or the digital signal may be realized by an independent computer system by being recorded on the recording medium and transmitted, or by being transmitted via the network, for example.

(15) The above embodiment and each of the above variations may be combined.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

In a data protection system according to the present disclosure, history information of a device is transmitted after being encrypted using a secure computation method, and servers compute a hash value without decrypting the encrypted history information. This enables verification of data while protecting the privacy of the data.

What is claimed is:

1. A data protection method for a data protection system which includes a device, a plurality of authentication servers, and a plurality of data servers, the data protection method being performed by a first authentication server included in the plurality of authentication servers, and comprising:

obtaining identification information and a third hash value from the device, the identification information identifying first encrypted history information of first history information which is targeted for data verification, the third hash value being obtained from the first history information;

generating first transaction data which includes the identification information and indicates a data verification request, and transmitting the first transaction data to the at least one of the plurality of data servers;

obtaining, from the at least one of the plurality of data servers, a fourth hash value computed by the at least one of the plurality of data servers performing computation processing on the first encrypted history information without decrypting the first encrypted history information, the first encrypted history information being identified by the identification information from among one or more items of encrypted history information, the encrypted history information being history information of the device encrypted using a secure computation method which enables computation without decrypting the encrypted history information, the encrypted history information being obtained from the device and recorded in the at least one of the plurality of data servers;

determining whether the third hash value and the fourth hash value match; and when the third hash value and the fourth hash value do not match, generating second transaction data which includes the identification information and indicates a deletion request for deletion of the first encrypted history information identified by the identification information, and transmitting the second transaction data to the at least one of the plurality of data servers.

2. The data protection method according to claim 1, further comprising:

when the third hash value and the fourth hash value do not match, recording the second transaction data in the distributed ledger in synchronization with the plurality of authentication servers excluding the first authentication server.

3. The data protection method according to claim 1, wherein the history information includes personal data of a user of the device.

4. The data protection method according to claim 1, further comprising:

receiving transaction data which is generated by the device and includes a first hash value obtained from history information of the device;

obtaining, from at least one of the plurality of data servers, a second hash value computed by the at least one of the plurality of data servers performing computation processing on encrypted history information without decrypting the encrypted history information, the encrypted history information being history information of the device encrypted using a secure computation method which enables computation without decrypting the encrypted history information, the encrypted history information being obtained from the device and recorded in the at least one of the plurality of data servers;

verifying the transaction data, and determining whether the first hash value and the second hash value match; and when a validity of the transaction data is verified and the first hash value and the second hash value match, recording the transaction data in a distributed ledger in synchronization with the plurality of authentication servers excluding the first authentication server.

5. A computer comprising:

a processor; and a memory that stores a program for causing the processor to execute the method according to claim 1.

6. A non-transitory storage medium storing a program that causes a processor to execute the method according to claim 1.

* * * * *